United States Patent
Miura

(10) Patent No.: US 11,472,272 B2
(45) Date of Patent: Oct. 18, 2022

(54) VEHICLE ENTRANCE STRUCTURE

(71) Applicant: TOYOTA JIDOSHA KABUSHIKI KAISHA, Aichi-ken (JP)

(72) Inventor: Takuya Miura, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 65 days.

(21) Appl. No.: 17/103,958

(22) Filed: Nov. 25, 2020

(65) Prior Publication Data

US 2021/0260974 A1   Aug. 26, 2021

(30) Foreign Application Priority Data

Feb. 25, 2020  (JP) .............. JP2020-029696

(51) Int. Cl.
*B60J 5/04* (2006.01)
*B60J 5/06* (2006.01)

(52) U.S. Cl.
CPC ............. *B60J 5/047* (2013.01); *B60J 5/0412* (2013.01); *B60J 5/06* (2013.01)

(58) Field of Classification Search
CPC ... B60J 5/047; B60J 5/0412; B60J 5/06; B60J 5/04; B60J 10/80; B62D 25/04; B62D 27/023; B62D 25/2036; B62D 25/025; B62D 25/06; B62D 25/20
USPC .......................................... 296/146.5, 146.9
See application file for complete search history.

(56) References Cited

U.S. PATENT DOCUMENTS

| | | | | |
|---|---|---|---|---|
| 1,953,953 | A * | 4/1934 | Carr ....................... | B62D 31/00 296/64 |
| 2,114,344 | A * | 4/1938 | Haberstump ...... | B62D 25/2036 49/467 |
| 2,313,812 | A * | 3/1943 | Duffy ....................... | B60J 10/80 296/97.23 |
| 2,833,589 | A * | 5/1958 | Ahrens .................... | B60J 10/80 49/484.1 |

FOREIGN PATENT DOCUMENTS

| | | | |
|---|---|---|---|
| JP | 2001063434 A | * | 3/2001 |
| JP | 2003237458 A | | 8/2003 |
| JP | 2019127145 A | | 8/2019 |

* cited by examiner

*Primary Examiner* — Pinel E Romain
(74) *Attorney, Agent, or Firm* — Hauptman Ham, LLP

(57) ABSTRACT

An entrance is provided in a side surface of a body of a vehicle. A side portion of the entrance in the width direction is constituted by a first frame member extending in the vehicle up-down direction. A lower end portion of the entrance is constituted by a floor extension portion of a floor member disposed on the inner side of the entrance with respect to the first frame member. The entrance is provided with a joint member. The joint member extends from the floor extension portion of the floor member to the first frame member, and closes a gap provided between the floor member and the first frame member. Thus, it is possible to suppress wind, rain, noise, etc. from entering a vehicle cabin through the gap.

5 Claims, 5 Drawing Sheets

VEHICLE ENTRANCE STRUCTURE

CROSS-REFERENCE TO RELATED APPLICATION

This application claims priority to Japanese Patent Application No. 2020-029696 filed on Feb. 25, 2020, incorporated herein by reference in its entirety.

BACKGROUND

1. Technical Field

The present disclosure relates to a vehicle entrance structure.

2. Description of Related Art

Vehicles are provided with entrances that are opened and closed by opening and closing door members. Many of such entrances have their outer peripheral portions constituted by frame members such as pillar portions and rocker portions of the vehicle.

Japanese Unexamined Patent Application Publication No. 2003-237458 (JP 2003-237458 A) discloses a vehicle in which the lower end of the entrance is constituted by a rocker portion. In this vehicle, a floor member is joined to a side surface of the rocker portion on an inner side in the vehicle width direction, and the height position of the floor member is located below the upper end portion of the rocker portion. Therefore, it is necessary to step over the level difference at the rocker portion when getting on/off the vehicle.

SUMMARY

It is conceivable to set the height position of the floor member above the rocker portion in order to reduce the level difference at the time of getting on/off the vehicle. That is, the floor member substantially constitutes the lower end portion of the entrance, and it is not necessary to step over the rocker portion when getting on/off the vehicle.

However, in the above configuration, the floor member and the frame member of the vehicle are separate components, so a gap is created between the floor member and the frame member of the vehicle at the lower end portion of the entrance. Thus, wind, rain, etc. may enter the vehicle cabin through the gap.

The present disclosure has been made in consideration of the above facts, and an object thereof is to obtain a vehicle entrance structure that reduces a level difference at the time of getting on/off the vehicle and that suppresses wind, rain, etc. from entering the vehicle cabin.

A vehicle entrance structure of the present disclosure according to aspect 1 includes: a first frame member extending substantially in a vehicle up-down direction and constituting a side portion of an entrance in a width direction, the entrance being provided in a side surface of a body; a floor member constituting a floor surface of a vehicle cabin and having one end disposed on an inner side of the entrance with respect to the first frame member to constitute a lower end portion of the entrance; and a joint member extending from the one end of the floor member to the first frame member and closing a gap provided between the floor member and the first frame member.

In the vehicle entrance structure of the present disclosure according to aspect 1, the vehicle entrance is provided in the side surface of the body. The side portion of the entrance in the width direction is constituted by the first frame member extending in the vehicle up-down direction. The lower end portion of the entrance is constituted by the one end of the floor member disposed on the inner side of the entrance with respect to the first frame member. Therefore, as compared with the case where the lower end portion of the entrance is constituted by a frame member such as a rocker, it is possible to make the area in the vehicle cabin from the floor surface to the entrance flat. Thus, the level difference at the time of getting on/off the vehicle can be reduced.

The entrance is provided with the joint member. The joint member extends from the one end of the floor member to the first frame member, and closes the gap provided between the floor member and the first frame member. This suppresses wind, rain, etc. from entering the vehicle cabin through the gap when the entrance is open, for example.

In the vehicle entrance structure of the present disclosure according to aspect 2, in the configuration according to aspect 1, the entrance is configured to be closed by opening and closing a door member, and the door member is provided with a seal member that continuously seals the floor member, the joint member, and the first frame member in a state where the entrance is closed.

In the vehicle entrance structure of the present disclosure according to aspect 2, the door member that closes the entrance is provided with the seal member. The seal member is configured to continuously seal the floor member, the joint member, and the first frame member in a state where the entrance is closed by the door member. Thereby, the gap provided between the entrance and the door member can be continuously sealed from the floor member to the first frame member. This suppresses wind, rain, noise, etc. from entering the vehicle cabin through the gap when the entrance is closed.

In the vehicle entrance structure of the present disclosure according to aspect 3, in the configuration according to aspect 1 or 2, the joint member is provided with a covering portion extended from one end on the floor member side and a covering portion extended from one end on the first frame member side, and a boundary portion between the joint member and the floor member and a boundary portion between the joint member and the first frame member are covered by the covering portions.

In the vehicle entrance structure of the present disclosure according to aspect 3, the joint member is provided with the covering portion extended from the one end on the floor member side and the covering portion extended from the one end on the first frame member side. The covering portions are configured to cover the boundary portion between the joint member and the floor member and the boundary portion between the joint member and the first frame member. Thus, it is possible to suppress wind, rain, noise etc. from entering the vehicle cabin through the boundary portions.

In the vehicle entrance structure of the present disclosure according to aspect 4, in the configuration according to aspect 2, a strip member is joined to the side surface of the body, the strip member having a strip shape and covering an outer peripheral portion of the entrance over an entire circumference, and the seal member continuously seals the floor member, the joint member, and the first frame member via the strip member.

In the vehicle entrance structure of the present disclosure according to aspect 4, the strip member that covers the outer peripheral portion of the entrance over the entire circumference is joined to the side surface of the body. Therefore, the seal member provided on the door member is configured to continuously seal the floor member, the joint member, and the first frame member via the strip member. Thus, the strip member provides the uniform sealing surface on the outer peripheral portion of the entrance, and the adhesive force of the seal member can be uniformly increased.

In the vehicle entrance structure of the present disclosure according to aspect 5, in the configuration according to any one of aspects 1 to 4, a lower end portion of the first frame member is connected to a second frame member extending along the one end of the floor member, and the second frame member is disposed below the floor member in the vehicle up-down direction, and is disposed at such a position that at least a part of the second frame member overlaps the floor member in a plan view.

In the vehicle entrance structure of the present disclosure according to aspect 5, the lower end portion of the first frame member is connected to the second frame member. The second frame member extends along the one end of the floor member that constitutes the lower end portion of the entrance. The second frame member is disposed at such a position that at least a part of the second frame member overlaps the floor member in a plan view. Thus, the offset amount of the second frame member to the outer side of the vehicle with respect to the floor member is reduced. Thus, it is possible to suppress the second frame member from interfering with the occupant and allow the occupant to move smoothly when the occupant gets on/off the vehicle. Moreover, it becomes easy to set a slope or the like at the entrance.

As described above, the vehicle entrance structure according to aspect 1 has excellent effects of reducing the level difference at the time of getting on/off the vehicle and further, suppressing wind, rain, etc. from entering the vehicle cabin through the gap provided between the floor member and the first frame member.

The vehicle entrance structure according to aspect 2 has an excellent effect of suppressing wind, rain, etc. from entering the vehicle cabin through the gap provided between the entrance and the door member.

The vehicle entrance structure according to aspect 3 has an excellent effect of suppressing wind, rain, etc. from entering the vehicle cabin through the boundary portion between the joint member and the floor member and the boundary portion between the joint member and the first frame member.

The vehicle entrance structure according to aspect 4 has an excellent effect of uniformly increasing the adhesive force of the seal member over the entire circumference of the entrance.

The vehicle entrance structure according to aspect 5 has an excellent effects of allowing the occupant to move smoothly at the time of getting on/off the vehicle and facilitating the setting of a slope or the like at the entrance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a vehicle 10 to which a vehicle entrance structure according to a first embodiment is applied will be described with reference to FIGS. 1 and 2. In addition, an arrow FR indicates the front side in the vehicle front-rear direction, an arrow UP indicates the upper side in the vehicle up-down direction, and an arrow RH indicates the right side in the vehicle width direction, which are appropriately shown in each drawing. Hereinafter, when terms indicating directions i.e., forward and rearward, upward and downward, and right and left are used in the description without any specification, these means forward and rearward in the vehicle front-rear direction, upward and downward in the vehicle up-down direction, and right and left as seen in the traveling direction of the vehicle.

Figure 1:
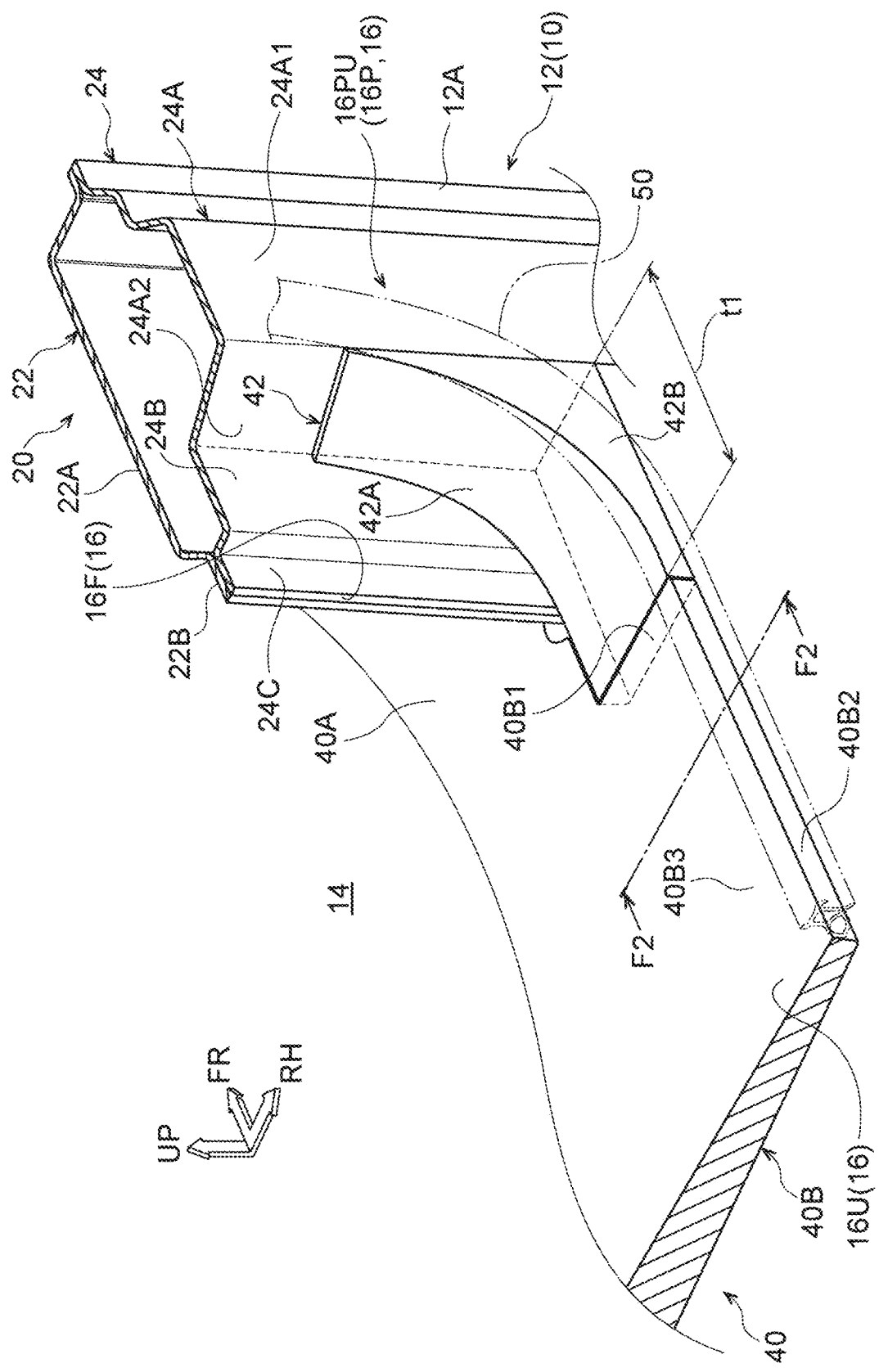
FIG. 1 is a partially enlarged perspective view showing, in an enlarged manner, a lower end portion of an entrance to which a vehicle entrance structure according to a first embodiment is applied.
Figure 2:
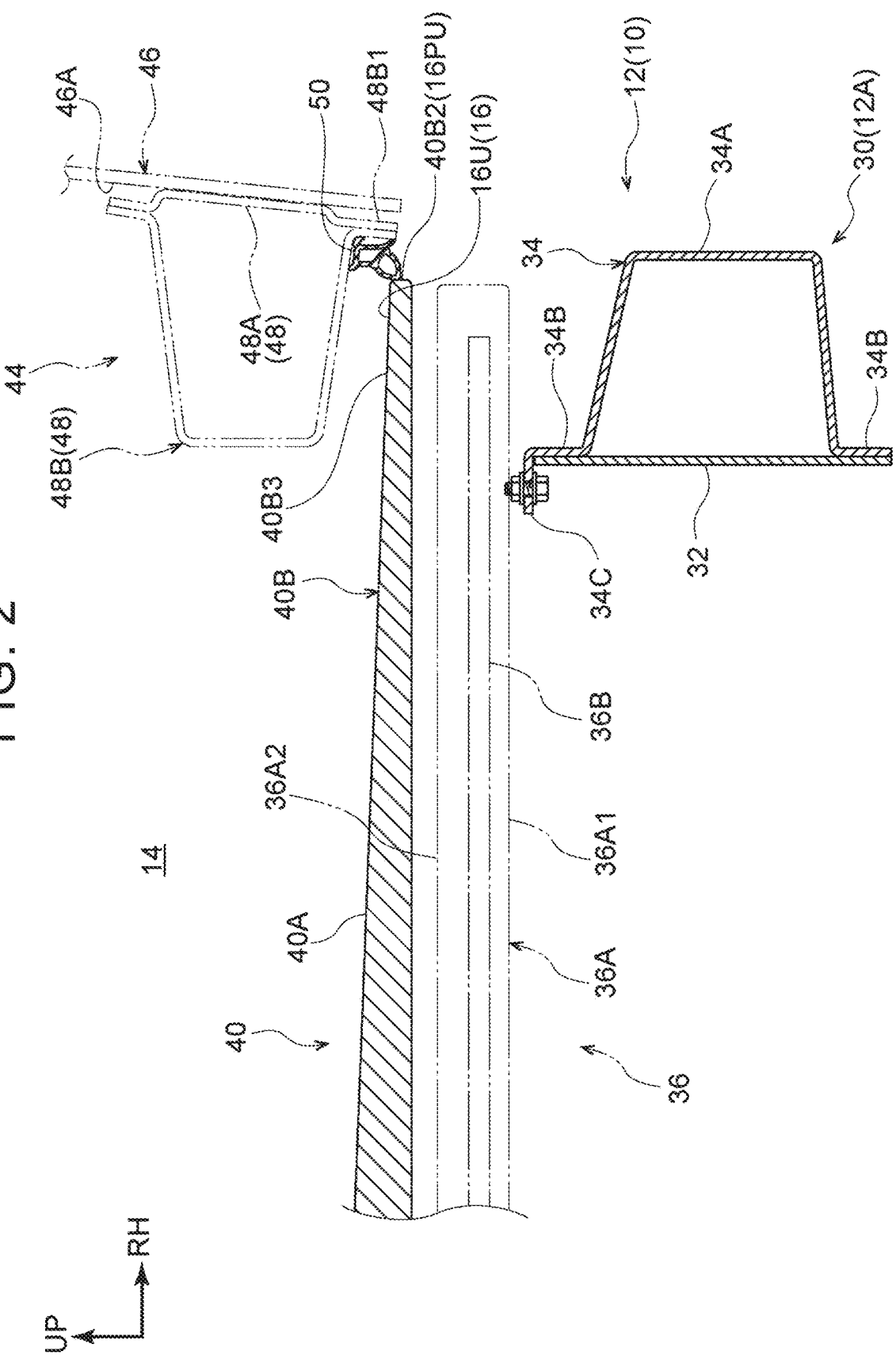
FIG. 2 is a sectional view showing a state cut along a line F2-F2 in FIG. 1 and showing a state in which the entrance is closed by a door member.

As partially shown in FIGS. 1 and 2, the vehicle 10 includes a body 12 composed of a plurality of frame members and having a frame shape, and a vehicle cabin 14 is provided inside the body 12. In addition, an entrance 16 for getting on/off the vehicle is provided in a side surface 12A of the body 12 on one side in the vehicle width direction. The entrance 16 is, for example, an opening having a generally rectangular shape as viewed in the vehicle width direction. Further, the entrance 16 can be opened and closed by opening and closing a door member 44 (see FIG. 2) described later.

The entrance 16 has first frame members 20 on one side and the other side in its width direction (opening width direction). The first frame members 20 are pillar portions that support a roof (not shown) of the vehicle 10. Hereinafter, the first frame member 20 that constitutes a side portion 16F of the entrance on the front side in the vehicle front-rear direction will be described using FIG. 1, but the first frame member 20 that constitutes a side portion of the entrance on the vehicle rear side has the same configuration.

The first frame member 20 has a hollow columnar shape and includes a pillar inner panel 22 disposed on the inner side in the vehicle width direction and a pillar outer panel 24 disposed on the outer side of the pillar inner panel 22 in the vehicle width direction. The pillar inner panel 22 is a long plate-shaped member made of metal and extends in the vehicle up-down direction. The vertical section of the pillar inner panel 22 is an open section that is open outward in the vehicle width direction, and includes a recess 22A having a rectangular cross section that is open outward in the vehicle width direction and flange portions 22B provided at the front and rear end portions of the recess 22A in the vehicle front-rear direction.

On the other hand, the pillar outer panel 24 is a long plate member made of metal and extends in the vehicle up-down direction. The vertical section of the pillar outer panel 24 is an open section that is open inward in the vehicle width direction. Describing more structurally, the pillar outer panel 24 includes a recess 24A having a rectangular cross section that is open inward in the vehicle width direction. The recess 24A includes an outer wall 24A1 that constitutes a wall of the pillar outer panel 24 on the outer side in the vehicle width direction, and lateral walls 24A2 that extend inward in the vehicle width direction from the two ends of the outer wall 24A1 in the vehicle front-rear direction. Further, flat surface portions 24B extending in directions away from each other are provided at the tip ends of the lateral walls 24A2 on the front and rear sides in the vehicle front-rear direction, and flange portions 24C for joining are provided at the tip ends of the flat surface portions 24B. The flange portions 24C are joined to the flange portions 22B of the pillar inner panel 22 by welding. Thus, the pillar inner panel 22 and the pillar outer panel 24 are joined together to define the hollow columnar first frame member 20 extending in the vehicle up-down direction.

The upper end portion of the first frame member 20 having the above configuration is coupled to a roof side rail (not shown) of the vehicle 10. The roof side rail constitutes a frame member of the roof that constitutes the ceiling portion of the vehicle cabin 14, is disposed on both sides of the roof in the vehicle width direction, and extends along the vehicle front-rear direction (all not shown). Further, the roof side rail constitutes the upper end portion (not shown) of the entrance 16. On the other hand, the lower end portion of the first frame member 20 is connected to a second frame member 30 that is configured integrally with or separately from the first frame member 20 (see FIG. 2).

As shown in FIG. 2, the second frame member 30 is configured as a rocker portion of the vehicle 10. The pair of second frame members 30 are arranged on the two sides of a lower part of the body 12 in the vehicle width direction and extend in the vehicle front-rear direction. More specifically, the second frame member 30 includes a rocker inner panel 32 disposed on the inner side in the vehicle width direction and a rocker outer panel 34 disposed on the outer side of the rocker inner panel 32 in the vehicle width direction. The rocker inner panel 32 is made of metal. The rocker inner panel 32 is a long plate-shaped member that extends in the vehicle front-rear direction with its plate thickness direction extending in the vehicle width direction.

On the other hand, the rocker outer panel 34 is a long plate-shaped member made of metal, and extends along the rocker inner panel 32. The vertical section of the rocker outer panel 34 is an open section that is open inward in the vehicle width direction. Describing more structurally, the rocker outer panel 34 includes a recess 34A having a rectangular cross section that is open inward in the vehicle width direction, and flange portions 34B that extend in directions away from each other from the upper and lower ends of the recess 34A. Further, the upper end portion of the flange portion 34B on the upper side in the vehicle up-down direction is provided with a fixing portion 34C that extends inward in the vehicle width direction from the upper end of the flange portion 34B. The flange portions 34B of the rocker outer panel 34 are welded to be joined to the upper end portion and the lower end portion of the rocker inner panel 32. Thus, the rocker inner panel 32 and the rocker outer panel 34 are joined together to define the second frame member 30 having a closed cross section in a vertical sectional view.

A slope module 36 is fixed to an upper part of the second frame member 30 in the vehicle up-down direction via the fixing portion 34C of the rocker outer panel 34. The slope module 36 has a rectangular box-shaped slope case 36A that is disposed below the entrance 16 and that is open outward in the vehicle width direction. A slope 36B is housed inside the slope case 36A. The slope 36B can be used by pulling it out of the slope case 36A to the side of the vehicle when an occupant sitting in a wheelchair gets on the vehicle or when packages are carried in using a trolley.

The fixing portion 34C of the rocker outer panel 34 is joined to a lower surface 36A1 of the slope case 36A using bolts and nuts (reference signs are omitted). A floor member 40 is joined to an upper surface 36A2 of the slope case 36A using bolts and nuts (reference signs are omitted).

The floor member 40 is a plate-shaped member that constitutes the floor surface of the vehicle cabin 14, and is supported by the slope case 36A from below in the vehicle up-down direction. The floor member 40 includes a floor body portion 40A having a rectangular plate shape in a plan view and a floor extension portion 40B extended outward in the vehicle width direction from one end portion of the floor body portion 40A in the vehicle width direction. The floor extension portion 40B corresponds to "one end of the floor member" in the present disclosure.

The floor extension portion 40B is disposed on the inner side of the entrance 16 with respect to the first frame member 20 described above, and constitutes a lower end portion 16U of the entrance 16. The floor extension portion 40B projects from the floor body portion 40A in a rectangular plate shape, and the second frame member 30 is disposed below the floor extension portion 40B in the vehicle up-down direction with the slope module 36 interposed therebetween. In the present embodiment, substantially the entire area of the second frame member 30 overlaps the floor extension portion 40B in a plan view. Therefore, the second frame member 30 is disposed at a position where the second frame member 30 hardly projects further outward than the floor extension portion 40B in the vehicle width direction.

The end surfaces of the outer extension portion of the floor extension portion 40B include a side end surface 40B1 disposed to face the first frame member 20 and an outer end surface 40B2 disposed along a side surface 12A of the body 12. The side end surface 40B1 is disposed to face the first frame member 20, and a gap t1 (see FIG. 1) is provided between the side end surface 40B1 and the first frame member 20. Specifically, the gap t1 is provided between the side end surface 40B1 and the lateral wall 24A2 of the pillar outer panel 24. The gap t1 corresponds to the "gap provided between the floor member and the first frame member" according to the present disclosure.

Here, as shown in FIG. 1, a joint member 42 that closes the gap t1 is disposed between the floor member 40 and the first frame member 20. The joint member 42 is a long block body extending from the side end surface 40B1 of the floor extension portion 40B toward the lateral wall 24A2 of the pillar outer panel 24, and is made of an elastic material such as rubber, for example. The joint member 42 may be made of a resin material or a sponge material.

An upper surface 42A of the joint member 42 is a curved surface that projects downward in the vehicle up-down direction. The upper surface 42A is disposed so as to be substantially flush with a floor surface 40B3 of the floor extension portion 40B and the lateral wall 24A2 of the first frame member 20, and continuously connects the floor surface 40B3 of the floor extension portion 40B and the lateral wall 24A2 of the first frame member 20. The curved surface constituted by the floor surface 40B3 of the floor extension portion 40B, the upper surface 42A of the joint member 42, and the lateral wall 24A2 of the first frame member 20 is disposed along an outline of an outer peripheral edge portion of the door member 44 when the door member 44 is closed, which will be described later. An outer side surface 42B of the joint member 42 disposed along the side surface 12A of the body 12 is disposed so as to be substantially flush with the outer end surface 40B2 of the floor extension portion 40B and the outer wall 24A1 of the first frame member 20. Thus, the outer end surface 40B2 of the floor extension portion 40B, the outer side surface 42B of the joint member 42, and the outer wall 24A1 of the first frame member 20 are integrated to constitute a continuous surface, and constitute a lower portion 16PU of an outer peripheral portion 16P of the entrance 16. The upper part of the outer peripheral portion 16P (not shown) is constituted by the outer wall 24A1 of the first frame member 20 and the outer wall (not shown) of the roof side rail.

As shown in FIG. 2, the entrance 16 described above can be opened and closed by opening and closing the door member 44. The door member 44 is, for example, a slide door that is slidably fixed to a front part of the vehicle. The door member 44 that was in a closed state in which the entrance 16 is closed by the door member 44 (see FIG. 2) moves forward in the vehicle front-rear direction while moving outward in the vehicle width direction, so as to be in an open state in which the entrance 16 is opened. The door member 44 is not limited to the slide door, and may be a hinged door.

The door member 44 includes a body panel portion 46 having a rectangular plate shape with its thickness direction extending in the vehicle width direction. A door frame 48 is joined to an inner surface 46A of the body panel portion 46 on the vehicle cabin 14 side along the peripheral edge portion thereof. The door frame 48 is a frame member having a closed section structure defined by an outer frame 48A and an inner frame 48B. The outer frame 48A is a strip plate member with its plate thickness direction extending in the vehicle width direction, and has an upper end portion and a lower end portion in the vehicle up-down direction are joined to the inner surface 46A of the body panel portion 46. The inner frame 48B extends along the outer frame 48A on the inner side of the outer frame 48A in the vehicle width direction. The vertical section of the inner frame 48B is a generally hat-shaped section that is open outward in the vehicle width direction, and flange portions 48B1 are provided at the upper and lower end portions of the inner frame 48B in the vehicle up-down direction. The flange portions 48B1 are respectively welded to the upper and lower end portions of the outer frame 48A. Thus, the inner frame 48B is joined to the outer frame 48A to define the door frame 48 having a closed section structure.

A seal member 50 is attached to the flange portion 48B1 provided at the lower end portion of the inner frame 48B. The seal member 50 is, for example, a hollow tube material made of an elastic material such as rubber, a sponge material, etc. The seal member 50 extends along the flange portion 48B1 of the door frame 48 and is attached to the peripheral edge portion of the door member 44 over the entire circumference thereof. The seal member 50 is configured to be in pressure contact with the outer peripheral portion 16P of the entrance 16 and the peripheral edge portion of the door member 44 in a state where the door member 44 is closed. Note that the sectional view of FIG. 2 partially shows a cross section of the lower part of the entrance 16, and the seal member 50 is in pressure contact with the outer end surface 40B2 of the floor extension portion 40B of the floor member 40. Similarly, in the lower portion 16PU of the outer peripheral portion 16P, the floor member 40, the joint member 42, and the first frame member 20 are continuously sealed by the seal member 50. Thus, a gap between the outer peripheral portion 16P of the entrance 16 and the peripheral edge portion of the door member 44 is sealed by the seal member 50.

Operations and Effects

As described above, in the present embodiment, the entrance 16 is provided in the side surface 12A of the body 12. In the entrance 16, the side portion 16F on the front side in the vehicle front-rear direction and the side portion (not shown) on the rear side in the vehicle front-rear direction that constitute the side portions in the width direction are constituted by the first frame members 20 extending in the vehicle up-down direction. Further, the lower end portion 16U of the entrance 16 is constituted by the floor extension portion 40B (one end) of the floor member 40 disposed on the inner side of the entrance 16 with respect to the first frame member 20. Therefore, as compared with the case where the lower end portion of the entrance is constituted by a frame member such as a rocker, it is possible to make the area from the floor surface of the vehicle cabin 14 to the entrance 16 flat. Thus, the level difference at the time of getting on/off the vehicle 10 can be reduced.

The joint member 42 is provided at the entrance 16. The joint member 42 extends from the floor extension portion 40B of the floor member 40 to the first frame member 20 and closes the gap t1 provided between the floor member 40 and the first frame member 20. Thus, wind, rain, etc. are suppressed from entering the vehicle cabin 14 through the gap t1.

Further, in the present embodiment, the seal member 50 is provided on the door member 44 that closes the entrance 16. The seal member 50 is configured to continuously seal the floor member 40, the joint member 42, and the first frame member 20 in a state where the entrance 16 is closed by the door member 44. Thereby, the gap provided between the entrance 16 and the door member 44 can be continuously sealed from the floor member 40 to the first frame member 20. This suppresses wind, rain, noise, etc. from entering the vehicle cabin through the gap when the entrance 16 is closed.

In addition, in the present embodiment, the lower end portion of the first frame member 20 is connected to the second frame member 30 extending along the floor extension portion 40B of the floor member 40, and the second frame member 30 is disposed at such a position that the substantially entire second frame member 30 overlaps the floor member 40 in a plan view. Thus, the offset amount of the second frame member 30 to the outer side of the vehicle with respect to the floor member 40 is suppressed. As a result, it is possible to suppress the second frame member 30 from interfering with the occupant and allow the occupant to move smoothly when the occupant gets on/off the vehicle 10. Further, it becomes easy to install the slope 36B that is pulled out obliquely downward from the entrance 16.

Second Embodiment

Hereinafter, a vehicle entrance structure according to a second embodiment will be described with reference to FIG. 3. The same components as those in the first embodiment described above are denoted by the same reference signs and the description thereof will be omitted.

Figure 3:
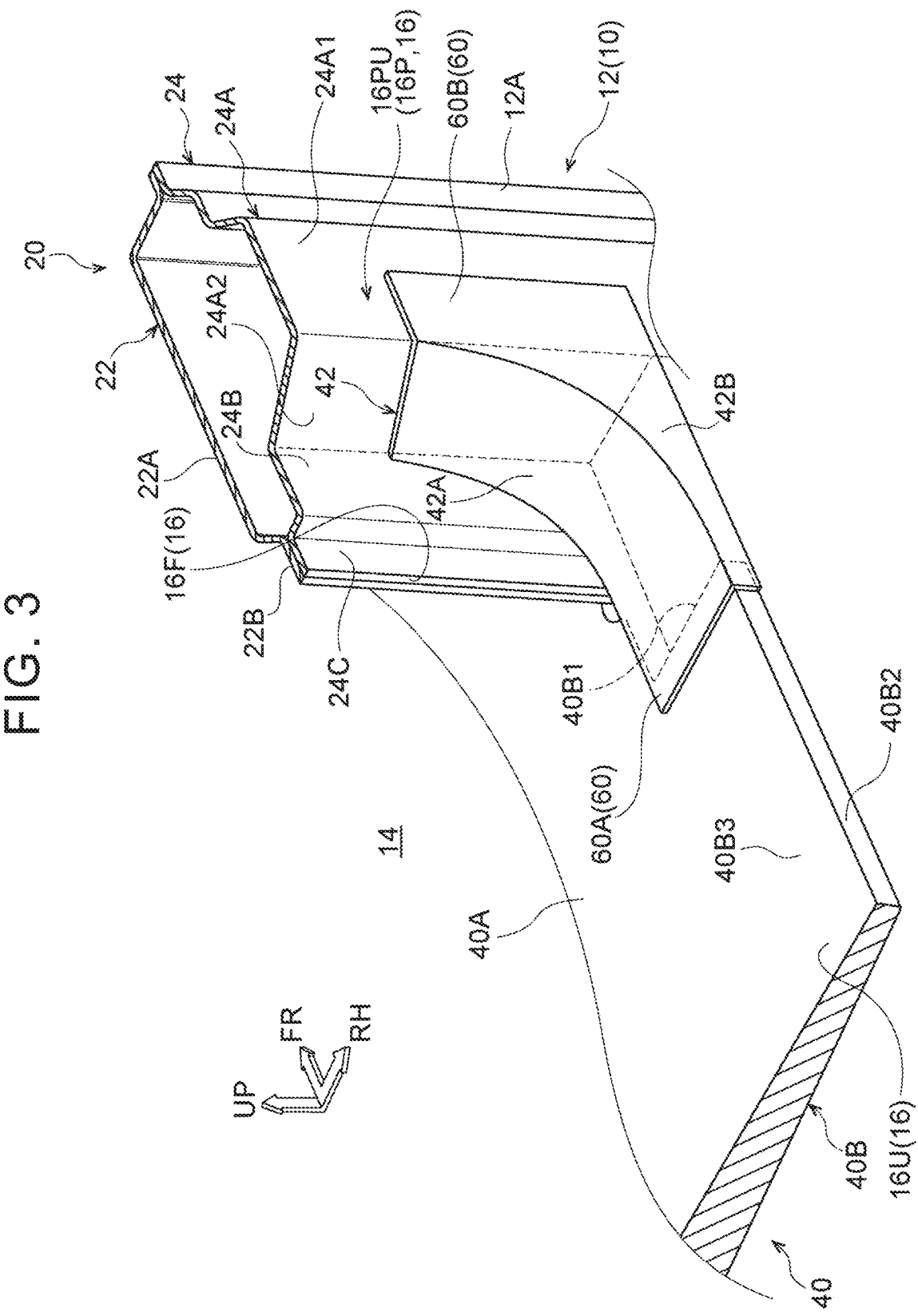
FIG. 3 is a partially enlarged perspective view corresponding to FIG. 1, showing a vehicle entrance structure according to a second embodiment.

As shown in FIG. 3, the second embodiment is characterized in that the joint member 42 is provided with covering portions 60. Other configurations are the same as those in the first embodiment.

The covering portions 60 include a first covering portion 60A and a second covering portion 60B. The first covering portion 60A extends from one end of the joint member 42 on the floor member side toward the floor member 40. The second covering portion 60B extends from one end of the joint member 42 on the first frame member 20 side toward the first frame member 20. The covering portions 60 cover the boundary portion between the joint member 42 and the floor member 40 and the boundary portion between the joint member 42 and the first frame member 20.

More specifically, the first covering portion 60A and the second covering portion 60B are configured as thin sheet members extended along the upper surface 42A or the outer side surface 42B of the joint member 42, and are provided so as to be integral with the joint member 42. The first covering portion 60A is extended along the upper surface 42A and the outer side surface 42B of the joint member 42 and partially covers the floor surface 40B3 and the outer end surface 40B2 of the floor extension portion 40B that are adjacent to the joint member 42. Thereby, the boundary portion between the joint member 42 and the floor member 40 is covered by the first covering portion 60A. The second covering portion 60B is extended along the outer side surface 42B of the joint member 42 and partially covers the outer wall 24A1 of the first frame member 20 that is adjacent to the joint member 42. Thereby, the boundary portion between the joint member 42 and the first frame member 20 is covered by the second covering portion 60B.

Operations and Effects

Since the joint member 42 having the above-described configuration basically follows the configuration according to the first embodiment, the same operations and effects can be obtained.

Further, in the present embodiment, the joint member 42 is provided with the covering portions 60 extended from one end on the floor member 40 side and one end on the first frame member 20 side. The boundary portion between the joint member 42 and the floor member 40 and the boundary portion between the joint member 42 and the first frame member 20 are covered by the first covering portion 60A and the second covering portion 60B, respectively, that constitute the covering portions 60. Thus, it is possible to suppress wind, rain, etc. from entering the vehicle cabin through the gap at the boundary portions.

Third Embodiment

Hereinafter, a vehicle entrance structure according to a third embodiment will be described with reference to FIG. 4. The same components as those in the first embodiment described above are denoted by the same reference signs and the description thereof will be omitted.

Figure 4:
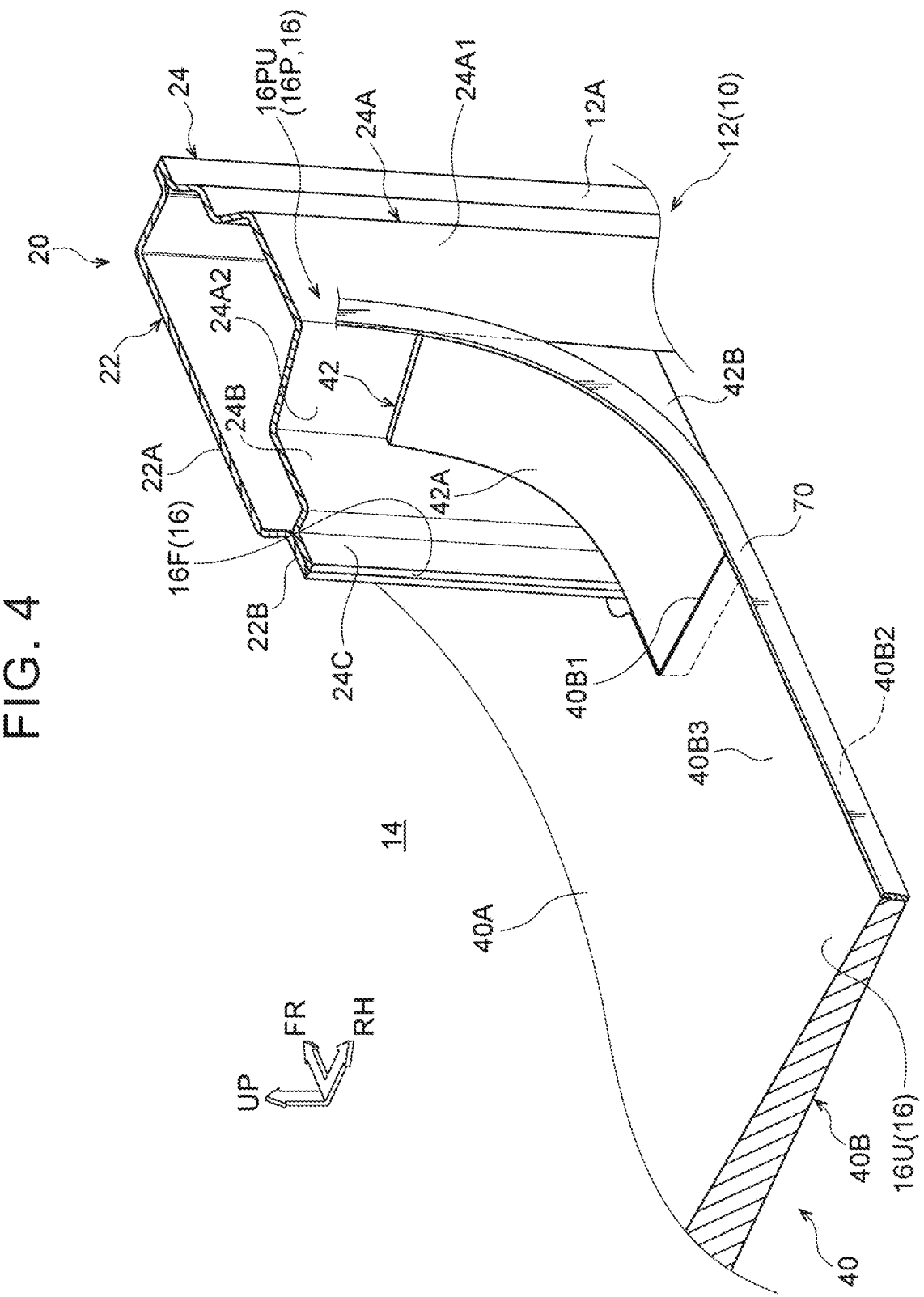
FIG. 4 is a partially enlarged perspective view corresponding to FIG. 1, showing a vehicle entrance structure according to a third embodiment.

As shown in FIG. 4, the third embodiment is characterized in that a strip member 70 that covers the outer peripheral portion 16P of the entrance 16 over the entire circumference thereof is provided. Other configurations are the same as those in the first embodiment.

The strip member 70 is made of, for example, a strip-shaped sheet metal. The strip member 70 is provided along the outer peripheral portion 16P of the entrance 16 and is joined to the side surface 12A of the body 12 with an adhesive. FIG. 4 partially shows the strip member 70 that covers the floor member 40, the joint member 42, and the first frame member 20 that constitute the lower portion 16PU of the outer peripheral portion 16P. As shown in FIG. 4, the outer peripheral portion 16P is covered by the strip member 70 over the entire circumference thereof across a plurality of members, so that a uniform seal surface 70S is provided on the outer peripheral portion 16P. The seal surface 70S is configured such that the seal member 50 comes into pressure contact with the seal surface 70S when the door member 44 is closed.

Operations and Effects

Since the vehicle entrance structure having the above-described configuration basically follows the configuration according to the first embodiment, the same operations and effects can be obtained.

Further, in the present embodiment, the strip member 70 that covers the outer peripheral portion 16P of the entrance 16 over the entire circumference thereof is joined to the side surface 12A of the body 12. Therefore, the seal member 50 provided on the door member 44 is configured to continuously seal the floor member 40, the joint member 42, and the first frame member 20 via the strip member 70. Thus, the strip member 70 provides the uniform seal surface 70S on the outer peripheral portion 16P of the entrance 16 and the adhesive force between the side surface 12A of the body 12 and the seal member 50 can be uniformly increased.

Fourth Embodiment

Figure 5:
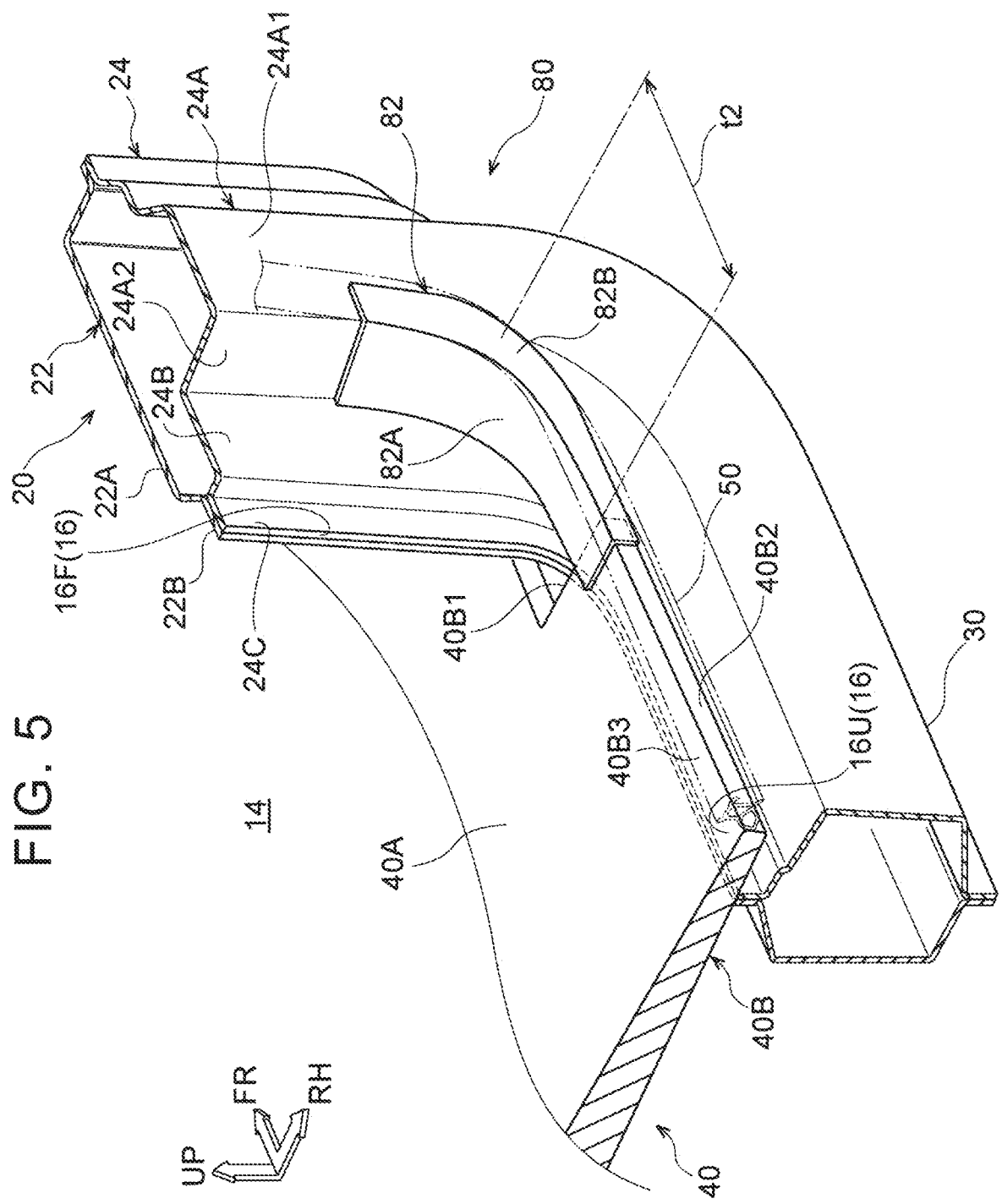
FIG. 5 is a partially enlarged perspective view corresponding to FIG. 1, showing a vehicle entrance structure according to a fourth embodiment.

Hereinafter, a vehicle 80 to which a vehicle entrance structure according to a fourth embodiment is applied will be described with reference to FIG. 5. The same components as those in the first embodiment described above are denoted by the same reference signs and the description thereof will be omitted. As shown in FIG. 5, in the fourth embodiment, the arrangement structure of the floor member 40, the first frame member 20, and the second frame member 30, and the structure of a joint member 82 are different from those in the first embodiment.

The vehicle 80 has the single-shell body 12 as an example, and the first frame member 20 that constitutes a pillar portion and the second frame member 30 that constitutes a rocker portion are integrally provided. Therefore, a portion extended downward in the vehicle up-down direction from the lower end portion of the first frame member 20 is bent to constitute the second frame member 30 extending rearward in the vehicle front-rear direction. Further, in the vehicle 80, the floor extension portion 40B that constitutes one end of the floor member 40 is directly supported by the second frame member 30.

The joint member 82 is a plate-shaped member made of an elastic material such as rubber. The joint member 82 extends from the floor extension portion 40B to the first frame member 20 and closes (covers) a gap t2 between the floor extension portion 40B and the first frame member 20. More specifically, the joint member 82 includes an upper surface portion 82A that faces upward in the vehicle up-down direction and an outer side surface portion 82B that faces outward in the vehicle width direction, and has a generally L-shaped cross section along the vehicle width direction. One end of the joint member 82 on the floor member 40 side is disposed so as to partially cover the floor surface 40B3 and the outer end surface 40B2 of the floor extension portion 40B, and one end of the joint member 82 on the first frame member 20 side is disposed so as to partially cover the outer wall 24A1 and the lateral wall 24A2 of the first frame member 20. Therefore, the upper surface portion 82A of the joint member 82 closes the gap t2 between the floor extension portion 40B and the first frame member 20. Further, in this state, the outer end surface 40B2 of the floor extension portion 40B, the outer side surface portion 82B of the joint member 82, and the outer wall 24A1 of the first frame member 20 are integrated to constitute a continuous surface, and constitute the lower portion 16PU of the outer peripheral portion 16P of the entrance 16. Thus, when the door member 44 is closed, the floor extension portion 40B, the joint member 82, and the first frame member 20 are continuously sealed by the seal member 50.

Operations and Effects

According to the present embodiment, the vehicle entrance structure according to the present disclosure can also be applied to the vehicle 80 having a single-shell structure in which the first frame member 20 and the second frame member 30 are integrally provided, and the same operations and effects as in the first embodiment can be obtained.

Further, in the present embodiment, the floor extension portion 40B that constitutes one end of the floor member 40 is directly supported by the second frame member 30. Therefore, the height position of the floor member 40 can be set lower as compared with the configuration in which the floor member 40 is spaced apart from the second frame member 30 upward in the vehicle up-down direction. Thus, the level difference between the floor surface of the vehicle cabin 14 and the road surface can be reduced, thereby allowing the occupant to move smoothly when the occupant gets on/off the vehicle.

Supplementary Description

In each of the above-described embodiments, the vehicle entrance structure according to the present disclosure is provided in one side surface of the vehicle 10, 80 in the vehicle width direction. However, the present disclosure is not limited to this. The vehicle entrance structure may be provided in a rear surface or front surface of the vehicle.

Further, in each of the above-described embodiments, the seal member 50 is attached to the door member 44, but the present disclosure is not limited to this. The seal member 50 may be attached or joined to the outer peripheral portion 16P of the entrance 16.

What is claimed is:

1. A vehicle entrance structure comprising:
 a first frame member extending substantially in a vehicle up-down direction and constituting a side portion of an entrance in a width direction, the entrance being provided in a side surface of a body;
 a floor member constituting a floor surface of a vehicle cabin and having one end disposed on an inner side of the entrance with respect to the first frame member to constitute a lower end portion of the entrance, wherein the floor member further comprises:
 a floor extension portion extending outward of the side portion in the width direction, wherein the floor extension portion defines a lower end portion of the entrance in the vehicle up-down direction, and the floor extension portion comprises a side end surface; and
 a joint member extending from the side end surface to the first frame member and filling a space between the floor member and the first frame member.

2. The vehicle entrance structure according to claim 1, wherein:
 the entrance is configured to be closed by opening and closing a door member; and
 the door member is provided with a seal member that continuously seals the floor member, the joint member, and the first frame member in a state where the entrance is closed.

3. The vehicle entrance structure according to claim 1, wherein the joint member is provided with a covering portion extended from one end on the floor member side and a covering portion extended from one end on the first frame member side, and a boundary portion between the joint member and the floor member and a boundary portion between the joint member and the first frame member are covered by the covering portions.

4. The vehicle entrance structure according to claim 2, wherein:
 a strip member is joined to the side surface of the body, the strip member having a strip shape and covering an outer peripheral portion of the entrance over an entire circumference; and
 the seal member continuously seals the floor member, the joint member, and the first frame member via the strip member.

5. The vehicle entrance structure according to claim 1, wherein:
 a lower end portion of the first frame member is connected to a second frame member extending along the one end of the floor member; and
 the second frame member is disposed below the floor member in the vehicle up-down direction, and is disposed at such a position that at least a part of the second frame member overlaps the floor member in a plan view.

* * * * *